Aug. 12, 1958     E. K. BOWMAN     2,846,942

FOWL CARCASS SUPPORTING MEANS

Filed June 4, 1956

INVENTOR.
Ellen K. Bowman
BY
M. Talbert Dick
ATTORNEY

Witness.
A. G. Martin

United States Patent Office 2,846,942
Patented Aug. 12, 1958

2,846,942

FOWL CARCASS SUPPORTING MEANS

Ellen K. Bowman, Johnson County, Iowa

Application June 4, 1956, Serial No. 589,180

4 Claims. (Cl. 99—427)

This invention relates to a means for supporting a fowl carcass and more particularly to one that will hold the fowl for preparation prior to cooking and if desired during the cooking process.

One of the most difficult tasks is the preparing of the bird for cooking and especially if the carcass is to be stuffed. Herebefore, the fowl is laid on a horizontal table for the work at hand. Under such circumstances the fowl objectionably slides laterally and is not rigidly held. Also the fowl is not maintained at the proper angle to the one doing the processing.

Therefore, one of the principal objects of my invention is to provide a fowl support that holds the bird from lateral sliding movement during the processing of the carcass for cooking.

A still further object of this invention is to provide a carcass support that will hold the carcass at any desired adjustable angle to the horizontal.

A still further object of my invention is to provide a supporting frame and detachable carcass cradle.

Still further objects of my invention are to provide a fowl carcass holder that is economical in manufacture, durable in use, and refined in appearance.

These and other objects will be apparent to those skilled in the art.

Figure 1:
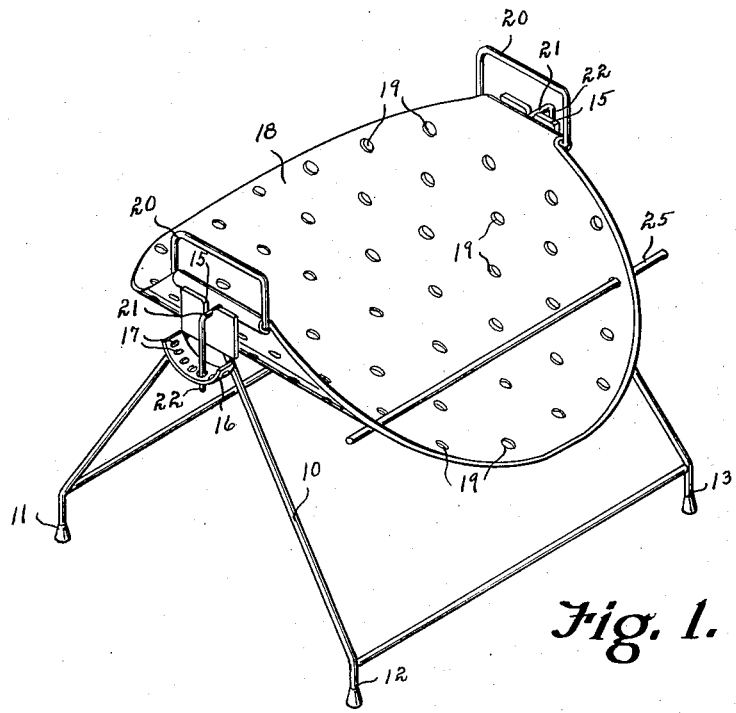
Figure 2:
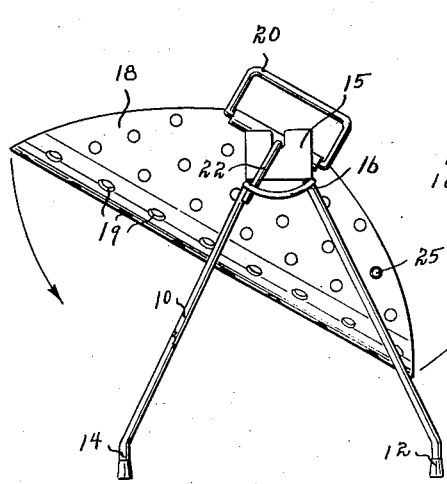
Figure 3:
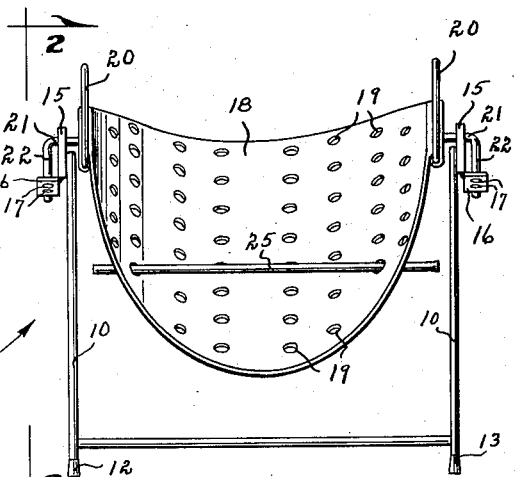

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a perspective view of my fowl carcass holding device, with the cradle portion extending in a horizontal plane, Fig. 2 is a side view of my device, taken from line 2—2 of Fig. 3, with the cradle adjusted to extend at an angle to the horizontal, and Fig. 3 is a rear end view of my carcass holder, and more fully illustrates its construction.

I have used the numeral 10 to designate the base frame portion having the four spaced apart feet 11, 12, 13 and 14. This frame has two upwardly spaced apart portions each supporting an open U-bearing 15. At the outer side of each upwardly extending frame portions and in a plane below the adjacent U-bearing is an upwardly curved bracket 16 having a plurality of holes 17 in its length, as shown in Fig. 3.

The numeral 18 designates the carcass cradle formed from a sheet, and having its periphery rounded and its width curved upwardly at each side as shown in Fig. 1. The cradle has a length greater than its width and is perforated to provide the drain passageway holes 19. At each side of the cradle is a foldable handle bail 20. At each center top side of the cradle is a bearing shaft 21. These two shafts first extend horizontally outwardly away from each other and then downwardly to form a finger 22, as shown in Fig. 3. The two horizontal shaft portions are adapted to detachably engage the two U-bearings 15 respectively. The two finger portions 22 are adapted to selectively extend through a hole 17 of the two brackets 16, respectively. Inasmuch as the two shafts are rigidly secured to the cradle, the selection of holes through which the fingers extend will determine the angle of the cradle to the support and to the horizontal.

If the selected holes are at the center of the two brackets the fingers will be in vertical planes and the cradle will be in a horizontal plane. On the other hand, if other holes are selected the cradle will be rigidly held accordingly in a canted position. Any desired tilt may be had merely by selecting the proper holes for the fingers. To remove the cradle it is merely necessary to lift it upwardly so that the holes and U-bearings are clear of the shaft means. To replace the cradle it is merely necessary to set the tray cradle down onto the stand support with the shaft means in the U-bearings and the shaft finger portions in the selected holes. The cradle will then be supported and rigidly held at the selected angle. The numeral 25 designates a rod selectively passed through the cradle holes 19 for better securing the fowl in the cradle, especially when the cradle is in canted position.

When a fowl is supported in my holder it facilitates the preparation of the fowl and also a better job is accomplished in the processing of the fowl. If desired the entire unit with the fowl may be placed into the cooking oven, or if desired, only the cradle portion used during the cooking.

Some changes may be made in the construction and arrangement of my fowl carcass supporting means without departing from the real spirit and purpose of my invention, and it is my intention to cover by my claims, any modified forms of structure or use of mechanical equivalents which may be reasonably included within their scope.

I claim:

1. In a carcass support, a frame, two spaced apart open U-bearings on said frame, a cradle, two shafts extending from the two sides of said cradle respectively and adapted to detachably engage said two U-bearings respectively, a finger on each of said shafts, and two brackets secured to said frame having at least one hole for detachably receiving said fingers.

2. In a carcass support, a frame, two spaced apart open U-bearings on said frame, a cradle, two shafts extending from the two sides of said cradle respectively and adapted to detachably engage said two U-bearings respectively, a finger on each of said shafts, and two brackets secured to said frame each having a row of holes for selectively receiving one of said fingers.

3. In a carcass support, a frame, two spaced apart open U-bearings on said frame, a cradle, two shafts extending from the two sides of said cradle respectively and adapted to detachably engage said two U-bearings respectively, a finger on each of said shafts, and two curved brackets secured to said frame each having a row of holes for selectively receiving one of said fingers.

4. In a carcass support, a frame, two spaced apart open U-bearings on said frame, a cradle open at its top and open at each end and free of end obstructions, two shafts extending from the two sides of said cradle respectively and adapted to detachably engage said two U-bearings respectively, a finger on one of said shafts, and a bracket secured to said frame having a row of holes for selectively receiving said finger.

References Cited in the file of this patent

UNITED STATES PATENTS

| 559,720 | Lacroix | May 5, 1896 |
| 2,505,723 | Rees | Apr. 25, 1950 |
| 2,588,614 | Capra et al. | Mar. 11, 1952 |

FOREIGN PATENTS

| 1,570 | Great Britain | July 4, 1856 |
| 599,108 | France | Oct. 12, 1945 |